(12) United States Patent
Perna

(10) Patent No.: US 8,598,529 B2
(45) Date of Patent: Dec. 3, 2013

(54) RADIATION DETECTION SYSTEM INCLUDING AN ARRAY OF SCINTILLATOR ELEMENTS AND PROCESSES OF FORMING THE SAME

(75) Inventor: Louis Perna, Elyria, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 200 days.

(21) Appl. No.: 13/220,524

(22) Filed: Aug. 29, 2011

(65) Prior Publication Data

US 2012/0056104 A1 Mar. 8, 2012

Related U.S. Application Data

(60) Provisional application No. 61/378,302, filed on Aug. 30, 2010.

(51) Int. Cl.
*G01T 1/20* (2006.01)

(52) U.S. Cl.
USPC ..................................... 250/361 R

(58) Field of Classification Search
USPC ..................... 250/361 R, 362, 367
See application file for complete search history.

(56) References Cited

U.S. PATENT DOCUMENTS

| | | | |
|---|---|---|---|
| 6,344,649 B2 | 2/2002 | Riedner et al. | |
| 6,841,783 B2 | 1/2005 | Malmin | |
| 2009/0173885 A1 | 7/2009 | Zeitler et al. | |
| 2009/0242838 A1 | 10/2009 | Soluri et al. | |
| 2009/0294682 A1 | 12/2009 | Perna | |
| 2009/0294683 A1 | 12/2009 | Perna | |
| 2010/0148074 A1* | 6/2010 | Menge et al. | 250/362 |

OTHER PUBLICATIONS

The International Search Report and the Written Opinion for International Application No. PCT/US2011/049595 received from the International Searching Authority (ISA/KR), dated Feb. 21, 2012, 10 pages.

* cited by examiner

*Primary Examiner* — Mark R Gaworecki
(74) *Attorney, Agent, or Firm* — Abel Law Group, LLP; Robert N. Young

(57) ABSTRACT

A process of forming a radiation detection system can include forming an array of scintillator elements, which can include joining a plurality of pieces including scintillator material together to form an object. A joining region can include the space between the immediately adjacent pieces. The process can also include cutting the object to obtain a portion having a face, wherein cutting is performed such that the portion includes parts of different pieces within the plurality of pieces. The process can further include cutting a groove within the portion, wherein the groove extends from the face and intersects the joining region. The process can include optically coupling the array to a photosensor. A radiation detection system can include an array of scintillator elements wherein a reflective sheet may lie between a pair of scintillator elements and no reflective sheet between another pair of scintillator elements.

16 Claims, 5 Drawing Sheets

RADIATION DETECTION SYSTEM INCLUDING AN ARRAY OF SCINTILLATOR ELEMENTS AND PROCESSES OF FORMING THE SAME

CROSS-REFERENCE TO RELATED APPLICATION

This application claims priority under 35 U.S.C. §119(e) to U.S. Patent Application No. 61/378,302 entitled "Radiation Detection System Including an Array of Scintillator Elements and Processes of Forming the Same," by Perna, filed Aug. 30, 2010, which is assigned to the current assignee hereof and incorporated herein by reference in its entirety.

FIELD OF THE DISCLOSURE

The present disclosure is directed to radiation detection systems including arrays of scintillator elements and processes of forming such radiation detection systems.

BACKGROUND

Radiation detection systems are used in a variety of applications. For example, radiation detector systems can include scintillator arrays that can be used for imaging applications, such as a medical diagnostic apparatus, a security screening apparatus, military applications, or the like. Further improvement of radiation detection systems is desired.

BRIEF DESCRIPTION OF THE DRAWINGS

Embodiments are illustrated by way of example and are not limited by the accompanying figures.

Figure 1:
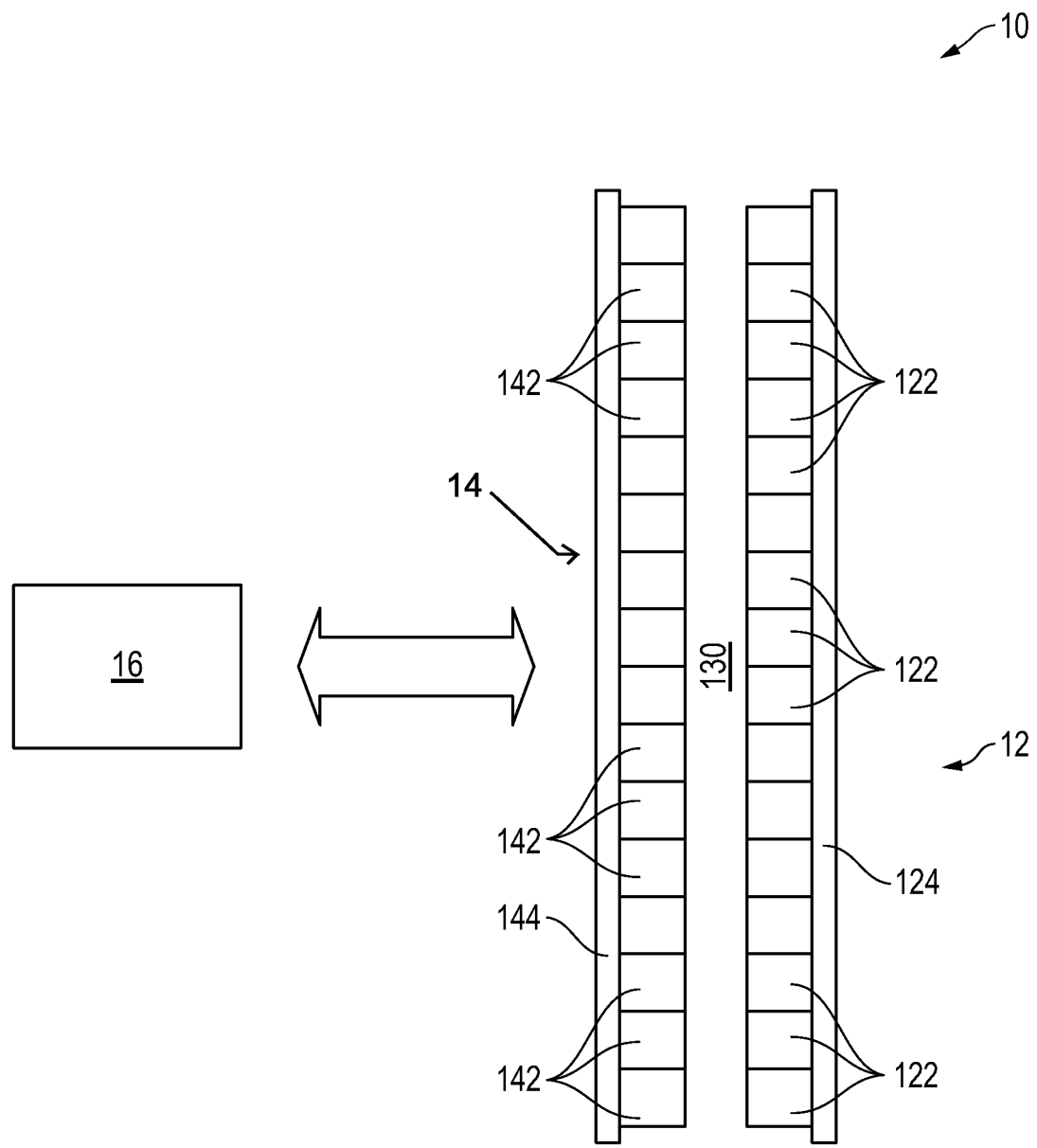
FIG. 1 includes a depiction of a radiation detection system in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the term "immediately adjacent" with respect to two particular items within an array is intended to mean that no other similar item is disposed between the two particular items. For example, in a scintillator array of scintillator elements, two immediately adjacent scintillator elements may contact or be spaced apart from each other; however, no other scintillator elements is disposed between the two immediately adjacent scintillator elements. Note that air, a reflective sheet, a filling material, or the like may be disposed between the two immediately adjacent scintillator elements.

The term "reflective material" is intended to mean a material, regardless of state, that can reflect light, such as scintillating light. Thus, the reflective material can be in the form of a filling compound, a liquid, a mirror, or the like. A reflective sheet includes a reflective material that is in a form of a sheet, which may be rigid or flexible.

The terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

FIG. 1 illustrates an embodiment of a radiation detection system 10. The radiation detection system can be a medical imaging apparatus, a well logging apparatus, a security inspection apparatus, military applications, or the like.

In the embodiment illustrated, the radiation detection system 10 includes an array 12 of scintillator elements 122, an array 14 of photosensors 142, and a control module 16. The array 12 includes scintillator elements 122 and a backing material 124. The scintillator elements 122 can include an inorganic scintillator material, such as a rare earth or other metal halide; a rare earth sulfide, oxysulfide, germinate, silicate, or aluminum garnet; $CdWO_4$; $CaWO_4$; ZnS; ZnO; ZnCdS, another suitable scintillator material, or the like. In a particular embodiment, the scintillator elements can include a lutetium orthosilicate, lutetium yttrium oxyorthosilicate, or a cesium iodide. The scintillator material can be polycrystalline or substantially monocrystalline. In an embodiment, the scintillator elements 122 can generate scintillating light when the scintillator elements 122 capture the targeted radiation. In a particular embodiment, the targeted radiation can include gamma radiation, x-rays, neutrons, another suitable radiation, or any combination thereof. The backing material 124 can be substantially transparent to the targeted radiation. In an embodiment, the backing material 124 may be substantially opaque to the scintillating light. In this manner, ambient light from outside the radiation detection system 10 is less likely to be misinterpreted by the array 14 of photosensors 142 or the control module 16 as being scintillating light. The backing material 124 can include a plastic, such as epoxy, polypropylene, another polymer, or any combination thereof. The backing material 124 itself may be reflective or a reflective material may be disposed between the scintillator elements 122 and the backing material 124. Further, an adhesive compound may be disposed between the scintillator elements 122 and the backing material 124, if needed or desired. The adhesive compound can be reflective or optically transparent or translucent to scintillating light. The shapes, sizes, and spacings for the scintillator elements 122 within the array 12 are discussed in more detail later in this specification.

The array 14 includes photosensors 142 and a substrate 144. The scintillator elements 122 are optically coupled to the photosensors 142. A substantially transparent material 130 can be disposed between the scintillator elements 122 and the photosensors 142. The material 130 can be in the form of a solid, a liquid, or a gas. In another embodiment, not illustrated, the scintillator elements 122 can contact the photosensors 142. The ratio of scintillator elements 122 to photosensors 142 can be 1:1, 2:1, 5:1, or even higher.

The photosensors 142 can include photomultiplier tubes, semiconductor-based photomultipliers, hybrid photosensors, or any combination thereof. The photosensors 142 can receive photons emitted by the scintillator elements 122 and the produce electrical pulses based on numbers of photons that are received. In a particular embodiment, the substrate 144 can include electrical connectors for the photosensors 142, a printed wiring board for routing electronic signals, or the like.

The photosensors 142 are electrically coupled to the control module 16. In the embodiment as illustrated, the photosensors 142 are bi-directionally coupled to the control module 16, and in another embodiment (not illustrated), the photosensors 142 are uni-directionally coupled to the control module 16. Electronic pulses from the photosensors 142 can be shaped, digitized, analyzed, or any combination thereof by the control module 16 to provide a count of the photons received at the photosensors 142 and produce information for an image or other purposes. The control module 16 can include an amplifier, a pre-amplifier, a discriminator, an analog-to-digital signal converter, a photon counter, another electronic component, or any combination thereof. The control module 16 can include logic to determine the location of the particular scintillating element or scintillator elements receiving targeted radiation based on the electronic pulses, or a lack thereof, based at least in part on electronic pulses provided by the photosensors 142. An image may be generated from the location and intensity information from the control module 16.

Figure 2:
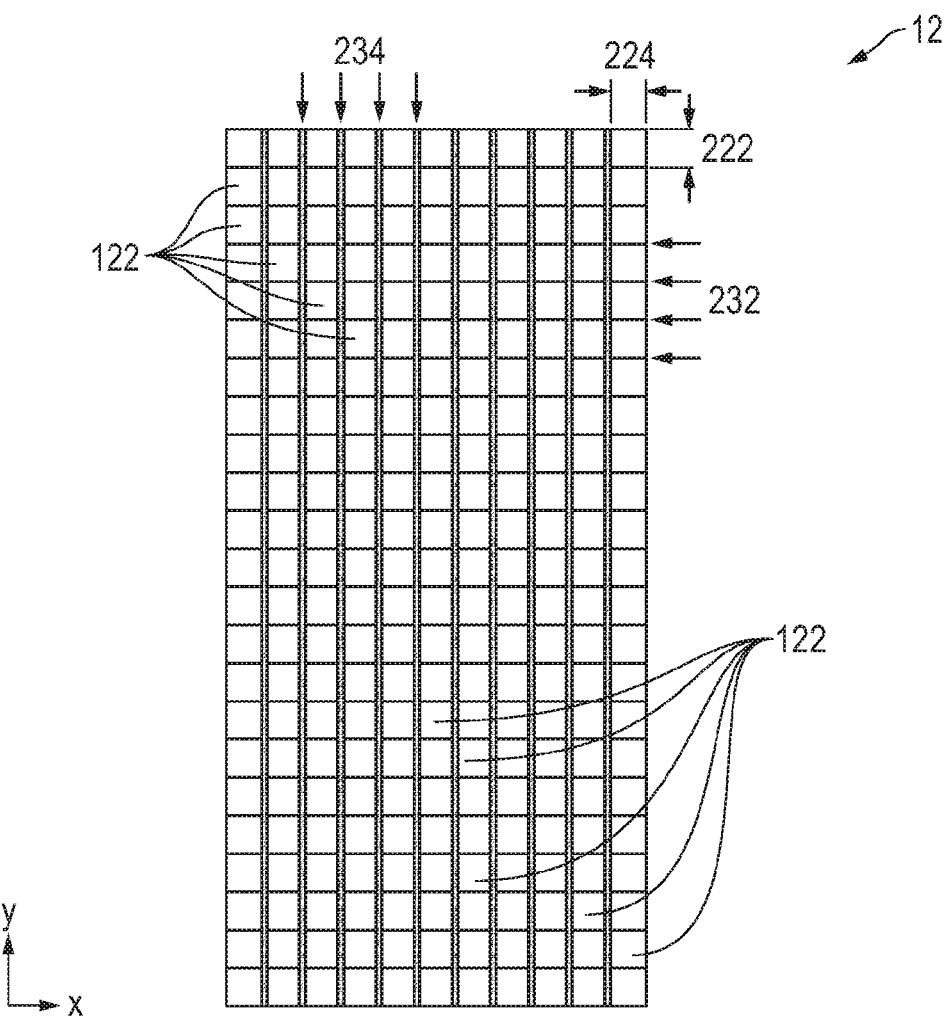
FIG. 2 includes an illustration of an array of scintillator elements in accordance with an embodiment.

FIG. 2 includes illustration of the array 12, as it would be seen by the photosensors 142 of the array 14. In the embodiment as illustrated, the scintillator elements 122 are organized into rows and columns that lie along hypothetical lines extending in the x-direction and the y-direction. In another embodiment, a different organization may be used. The scintillator elements 122 are separated from one another by spaces 232 and spaces 234. In a particular embodiment, the spaces 232 may include a solid material or may be left open to air or another gas. Accordingly, a space may or may not be filled.

The lengths of the spaces 232 are illustrated as extending in the x-direction, and the lengths of spaces 234 are illustrated as extending in the y-direction. The lengths of the spaces 232 are substantially parallel to one another and are substantially perpendicular to lengths of the spaces 234. Similar to the spaces 232, the spaces 234 are substantially parallel to one another. In another embodiment, the lengths of the spaces 232 may lie along lines that intersect one another, and the lengths the spaces 232 may intersect the lengths of the spaces 234 at angles other than 90°. In a particular embodiment (not illustrated), the scintillator elements 122 may be in the form parallelograms which angles defined by two adjacent sides are acute angles or obtuse angles. Similar to the lengths of the spaces 232, the lengths of the spaces 234 may lie along lines that intersect one another. In another particular embodiment (not illustrated), the scintillator elements may have shapes that are trapezoids or triangles.

As the targeted radiation is captured by a particular scintillator element 122, that particular scintillator element 122 can emit scintillator light. In another embodiment, scintillator light may be generated by a plurality of scintillator elements 122, and the intensity of scintillating light may be different between scintillator elements 122. The scintillator light can be received by and converted to electronic pulses which can be used to determine the particular location where the targeted radiation was captured by the array 12.

The scintillator elements 122 are illustrated as being rectangular. In another embodiment, the scintillator elements 122 may have a different shape, such as a triangle, another quadrilateral, a hexagon, an octagonal, another polygon, a circle, an oval, an ellipsoid, or the like. In a further embodiment (not illustrated), the scintillator elements may have different shapes within the same array. After reading this specification, skilled artisans will be able to determine the shape of scintillator elements 122 that meets the needs or desires for a particular application.

As the size of the scintillator elements 122 decrease, the resolution of the image generated from the array 12 can increase. Each of the scintillator elements 122 can correspond to a pixel. However, when the scintillator elements 122 are sufficiently small, such scintillator elements 122 may be difficult to handle with a conventional pick-and-place tool. Processes as described herein can be used to form relatively small scintillator elements 122 while still allowing the use of handling equipment that is designed for larger items. Also, the processes described herein can produce at least one set of spaces that are smaller than can be obtained using a conventional cutting tool.

The dimensions of the scintillator elements 122 can be characterized by a length, a width, and a thickness. Referring to FIG. 2, a scintillator element has a length (noted by dimension 222) and a width (noted by dimension 224). Other scintillator elements 122 also have lengths and widths. The thicknesses extend into the page for FIG. 2. In an embodiment, the lengths and the widths of the scintillator elements 122 are no greater than approximately 9 mm, in another embodiment, no greater than approximately 5 mm, and in a further embodiment, no greater than approximately 3 mm. In a particular embodiment, the lengths and the widths of the scintillator elements 122 are in a range of approximately 1 to 2 mm. The thicknesses of the scintillator elements 122 may be at least in part determined by the stopping power of the scintillator material within the scintillator elements 122. Ideally, all of the targeted radiation that reaches a scintillator element 122 is captured by that scintillator element 122. Thus, the thickness depends at least in part on the type and energy of targeted radiation. The thickness can be at least approximately 0.5 mm, and in another embodiment can be at least approximately 1.1 mm. In another embodiment, the thickness may be no greater than approximately 500 mm. In a particular embodiment, the scintillator elements include $CdWO_4$ and the targeted radiation is neutrons, and thus, the thickness is in a range of approximately 1.5 to 2.5 mm.

As compared to the lengths and widths of the scintillator elements 122, the widths of the spaces 232 and 234 are significantly smaller. The widths of the spaces between immediately adjacent scintillating elements may be no greater than approximately 0.10 mm (4 mils). In another embodiment, the widths may be no greater than approximately 0.08 mm (3 mils), no greater than approximately 0.05 mm (2 mils), or no greater than approximately 0.03 mm (1 mil). In a further embodiment, the widths of the spaces may be at least 0.006 mm (0.25 mils). Skilled artisans appreciate that the complexity in fabricating the array can increase exponentially with a linear decrease in the width of the space. Therefore, achieving such small widths for the spaces can require more than merely just scaling dimensions downward.

Attention is now directed to processes of making the radiation detection system 10 as illustrated in FIGS. 3 to 8. While the formation of the array 12 is illustrated with respect to particular shapes, skilled artisans will appreciate that other shapes may be used.

Figure 3:
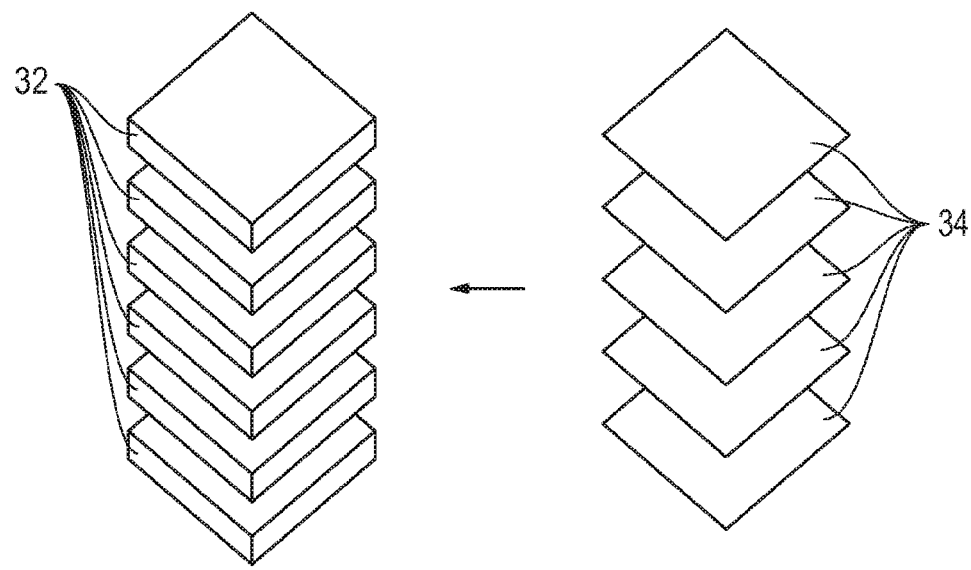
FIG. 3 includes an illustration of pieces of scintillator material and reflective sheets before joining the pieces together.

FIG. 3 includes an illustration of a perspective view of pieces of 32 that include a scintillator material, and reflective sheets 34 of a reflective material. The pieces 32 can include any of the scintillator materials previously described. The pieces 32 are in the form of plates that have substantially identical shapes. In the embodiment as illustrated, the faces of each piece 32 are along the top and bottom surfaces of each piece 32 and are separated by a thickness. The faces can have a shape, such as a triangle, another quadrilateral, a hexagon, an octagonal, another polygon, a circle, an oval, an ellipsoid, or the like. In another embodiment, the pieces 32 may have different shapes as compared to one another. The thicknesses of the pieces 32 can be substantially the same or may be different. In a particular embodiment, the thicknesses of the pieces 32 will correspond to the y-direction dimensions of each scintillator element 122 as illustrated in FIG. 2. Thus, in an embodiment, the thicknesses of the pieces 32 are no greater than approximately 9 mm, in another embodiment, no greater than approximately 5 mm, and in a further embodiment, no greater than approximately 3 mm.

The reflective sheets 34 can include a white plastic sheet, a metal foil, or a metalized plastic sheet, such as aluminized mylar. The reflective sheets 34 can reflect diffused light or be specular. The thicknesses of the reflective sheets 34 can be substantially the same or may be different between one another. The reflective sheets 34 may have a shape that substantially corresponds to the shapes of the pieces 32. In another embodiment the reflective sheets 34 may be larger or smaller than the facial area of the pieces 32. The thicknesses of the reflective sheets 34 may generally correspond to the widths of the spaces 232 as illustrated in FIG. 2. In an embodiment, the thicknesses of the reflective sheets may be no greater than approximately 0.10 mm (approximately 4 mils), in another embodiment, no greater than approximately 0.08 mm (approximately 3 mils), and in a further embodiment, no greater than approximately 0.05 mm (approximately 2 mils) or no greater than approximately 0.03 mm (1 mil). In a further embodiment, the thicknesses of the pieces 32 may be at least 0.006 mm (0.25 mils).

Figure 4:
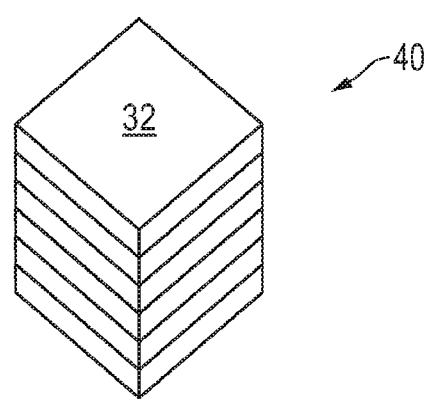
FIG. 4 includes an illustration of the pieces of scintillator material of FIG. 3 after joining the pieces together.

An adhesive material can be applied to faces of the pieces 32, and the reflective sheets 34 can be inserted between each of the pieces 32 as generally illustrated by the arrow in FIG. 3. The pieces 32 and reflective sheets 34 can then be joined together to form an object 40 as illustrated in FIG. 4. Due to the relatively thinner thicknesses of the reflective sheets 34, the reflective sheets 34 are not illustrated in subsequent figures, although the reflective sheets 34 are present. The joining can be performed by pressing the pieces 32 and reflective sheets 34 together, and then removing any residual adhesive material that may flow from region between the pieces 32. As used herein, such region is referred to as a joining region which includes the region between faces of immediately adjacent pieces 32. Therefore, the joining region can include one of the reflective sheets 34 and the adhesive material that remains between the pieces 32. In the embodiment as illustrated in FIG. 4, the object 40 can be in the shape of a block. In another embodiment, the adhesive material may not be required, as the reflective sheet 34 may be adhesive, or the pieces 32 and reflective sheets 34 may be joined such that an adhesive material is not required.

Figure 5:
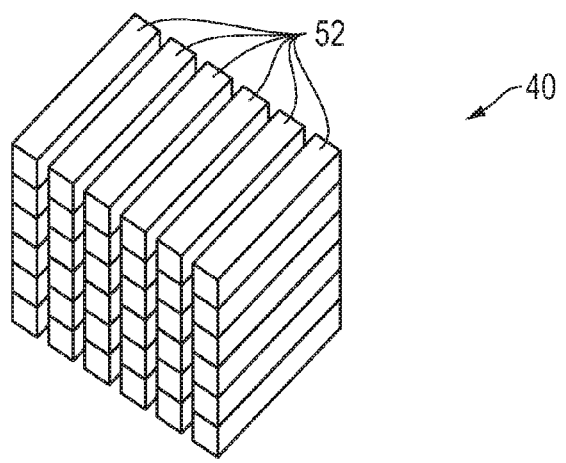
FIG. 5 includes an illustration of the pieces of scintillator material of FIG. 4 after cutting portions of the joined pieces.

FIG. 5 includes an illustration of a perspective view after the object 40 is cut into portions 52. In the embodiment as illustrated, the portions 52 are in the shape of slices, and the thickness of each portion 52 will correspond to the thickness of the scintillator elements 122. Thus, if the scintillator elements 122 are to be 2 mm thick, then the portions 52 have a thickness of approximately 2 mm. The cutting may be substantially perpendicular to the joining regions or at a significantly different angle. The cutting operation can be performed using a saw, a laser, a water jet, another suitable cutting tool, or any combination thereof. In a particular embodiment, the cutting operation can be performed using a wire saw.

Figure 6:
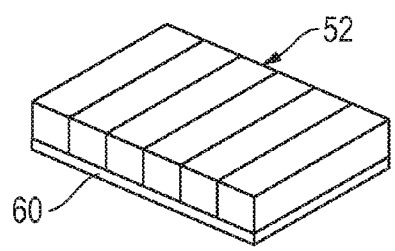
FIG. 6 includes an illustration of the portion of FIG. 5 after forming a backing material along a side of a portion.

FIG. 6 includes an illustration of a perspective view of a portion 52 and a backing material 60. The backing material 60 can provide sufficient mechanical support for the portion 52 during subsequent operations. The backing material 60 can be relatively transparent to the targeted radiation. The backing material 60 may be formed along a face of the portion 52. In a particular embodiment, a layer epoxy can be coated along the face of the portion 52 and allowed to harden. In another embodiment, the backing material 60 can include a substrate that is glued or otherwise adheres to the portion 52. In another embodiment (not illustrated), the backing material 60 may include a plurality of portions 52 at this point in the process.

Figure 7:
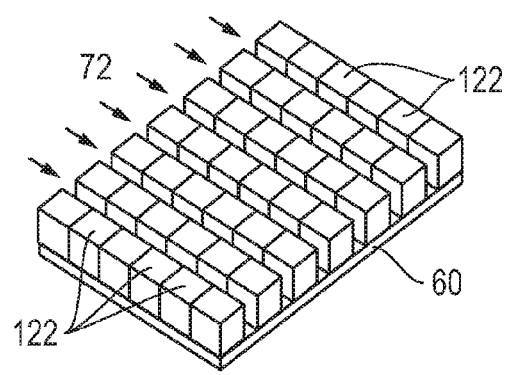
FIG. 7 includes an illustration of the portion of FIG. 6 after cutting grooves into the portion.

FIG. 7 includes an illustration of a perspective view after cutting grooves 72 within the portion 52. The grooves 72 extend from face of the portion 52 and intersect the joining regions within the portion 52. In a particular embodiment, the cutting operation can be performed such that the grooves extend completely through the portion 52 and partly into the backing material 60. In another particular embodiment, the grooves may extend only partly through the thickness of the portion 52. For example, the depths of the grooves may be at least approximately 30% of the thickness of the portion 52 or at least approximately 50% of the thickness of the portion 52. After reading this specification, skilled artisans will be able to determine the depths of the grooves for a particular application (for example, substantially complete optical isolation or partial optical isolation between scintillator elements).

The lengths of the grooves 72 may be substantially perpendicular to the joining regions or at a significantly different angle. The grooves can be formed using a saw, a laser, a water jet, another suitable tool, or any combination thereof. The widths of the grooves 72 may be substantially the same or slightly wider than the width of the portion of the tool used in cutting the grooves 72. For example, if a saw blade is used, the widths of the grooves 72 correspond to the width of the saw blade. At this point in the process, the scintillator elements 122 are formed. Referring to FIG. 2, the x-direction dimensions of the scintillator elements 122 generally corresponds to the dimension of the scintillator elements between the grooves in FIG. 7.

Figure 8:
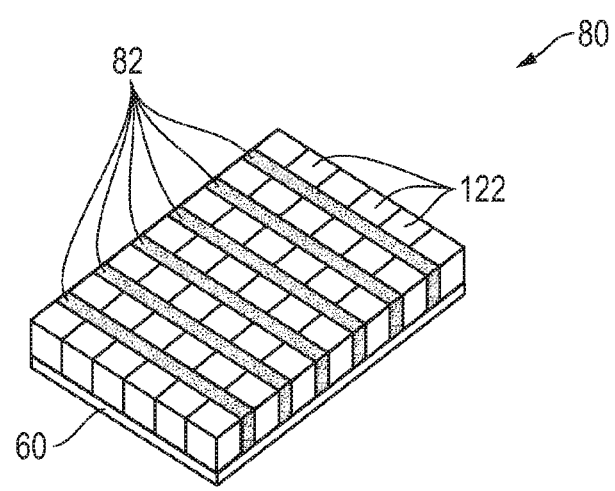
FIG. 8 includes an illustration of the portion of FIG. 7 after forming a reflective material within the grooves.

FIG. 8 includes an illustration of a perspective view after filling the grooves 72 (in FIG. 7) with a reflective material 82 to form a substantially completed array 80 of scintillator elements 122. The reflective material can include a substantially white or specular material. In a particular embodiment, the reflective material 82 can include an epoxy or other polymeric material that includes white or metal particles. In an alternative embodiment, the grooves 72 may be left open and not subsequently filled. The array 80 may be used as a standalone scintillator array or may be incorporated into a larger array in which the array 80 is a segment of the larger array. After reading the specification, skilled artisans will be able to determine how to make scintillator arrays of nearly any size, such as the scintillator array 12. A polishing or other machining operation may be performed to provide a smoother surface for the scintillator elements 122 if needed or desired. The reflective sheets 34 and the reflective material 82 (and grooves 72 in FIG. 7) correspond to the spaces 232 and 234 in FIG. 2.

Referring to FIG. 1, the scintillator array 12 and the photosensor array 14 can then be mounted within an apparatus such that the scintillator elements 122 and the photosensors 142 are optically coupled to one another. The photosensors 142 can electrically coupled to the control module 16 through connectors, wirings, ribbon cables, switches or other electronic components used in the apparatus.

Embodiments described herein can be useful for generating small-sized scintillator elements while still being able to use conventional handling and cutting tools when forming the array 12 of scintillator elements 122. Referring to FIG. 7, the grooves 72 (corresponding to spaces 234 in FIG. 2) can be formed with a conventional saw blade. However, the spaces 232 can be more difficult to form with a saw blade or other conventional cutting tool. With respect to a saw, as the widths of the spaces 232 in FIG. 2 decrease, the thickness of the scintillator elements 122 (which corresponding to the thickness of the portion 52 in FIG. 5) may be limited. As the thickness of the scintillator elements 122 increase, the likelihood that the saw blade will fail increases. For example, if the scintillator material is relatively hard, the saw blade can wear out prematurely or if the scintillator material is relatively soft, the scintillator material can accumulate within the teeth or other cutting surfaces of the saw blade rendering further cutting substantially less effective.

Thus, when the thickness of the portion 52 is at least 0.5 mm, a saw may have difficultly forming the spaces 232 at widths no greater than approximately 0.10 mm. The problem becomes more difficult as the thickness of the portion 52 increases (e.g., 1.1 mm, 2 mm, 5 mm, etc.), as the widths of the spaces decreases (e.g., 0.8 mm, 0.05 mm, etc.). As described herein, the spaces 232 are formed by an additive process, such as joining the pieces 32 and 34, rather than a subtractive process, such as cutting grooves. Therefore, relatively narrow spaces, such as spaces 232, can be achieved without complications caused by cutting processes.

Further, potentially expensive and complex pick-and-placed tools are not required. A pick-and-place tool can be used to mount the scintillator elements onto the backing material or substrate. As the size of the scintillator elements continue to decrease, the scintillator elements can be harder to handle, and thus, a pick-and-place tool will need to manipulate the scintillator elements with smaller tolerances. Accordingly, more expensive or complicated tools will be needed to achieve proper placement of scintillator elements. The processes described herein can use relatively larger dimensions and allow more conventional pick-and-place tools or even manual positions to be used when manipulating the portion 52. Individual scintillator elements 122 are not formed until the portion 52 is secured by the backing material 60. Therefore, the processes described herein can be used to reduce capital costs associated with fabrication equipment.

Conventional scintillator arrays may have reflective sheets along both rows and columns of scintillator elements; however, such arrays may have unacceptable registration to corresponding photosensors, particularly as the facial dimensions of the scintillator elements decrease. Other conventional scintillator arrays may have grooves cut in both the row and column directions. Such grooves may be filled with a material or remain open. Such other conventional scintillator arrays can have acceptable registration to photosensors; however, the widths of the grooves may be limited by the cutting tool used. For example, a saw blade may have a thickness of at least 0.15 mm, and therefore, the widths of the grooves, and accordingly spaces, will be at least 0.15 mm. As the size of the scintillator elements are reduced, the fraction of area occupied by the spaces increase due to the limits of the cutting tool.

Regardless of how a conventional scintillator arrays have been fabricated, the space between immediately adjacent scintillator elements in the conventional scintillator array are not believed to have been less than 0.12 mm (4.7 mils). By using the processes described herein, the space between immediately adjacent scintillating elements can be reduced to approximately 0.10 mm (4 mils) and reduced even further. The reduce spacing can help to improve resolution of images produced from the scintillator array.

Scintillator arrays formed using the concepts as described herein can be used to help achieve good registration between the scintillator elements and the corresponding photosensors while trying to keep the fraction of area occupied by spaces between the scintillator elements from exceeding a predetermined limit. In a particular embodiment, the use of the reflective sheets can help to reduce the total area occupied by spaces, and the use of a backing material when sawing can help keep registration under better control.

Example

The concepts described herein will be further described in the Example, which does not limit the scope of the invention described in the claims. The Example demonstrates a particular process of forming a scintillator array.

Referring to FIG. 3, the portions 32 are six plates that include a $CdWO_4$ scintillator material, wherein each plate is approximately 25 mm×25 mm×2 mm. The reflective sheets 34 are sheets of white plastic that are approximately 25 mm×25 mm×0.03 mm (approximately 1 mil). An adhesives compound is applied to the faces of the plates with the exception of the outermost faces of the topmost and bottommost plates. The white sheets of plastic are disposed between the plates, and the combination of the plates and sheets are pressed together to form a block. Excess adhesive compound flows out between the plates during pressing, and such excess adhesive compound is removed. At this point the block has dimensions of approximately 25 mm×25 mm by 12 mm. The block is then cut using a wire saw into slices that are approximately 2 mm thick. Thus, six slices are obtained from the block wherein each slice is approximately 25 mm×12 mm×2 mm. An epoxy is then coated along a face of the slice. The epoxy is allowed to harden and forms the backing material for the slice.

A saw blade is then used to cut grooves completely through the thickness of the slice and partly into the epoxy that is part of the backing material. The saw blade is conventional and has a width of approximately 0.15 mm (approximately 6 mils). The widths of the grooves are substantially the same as the width of the saw blade used to form the grooves. The grooves are filled with an epoxy that includes $TiO_2$ and excess epoxy along the face of the slice is removed. At this point, the scintillator array is formed and can be used as a standalone array or may be incorporated into a larger scintillator array.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

In a first aspect, a radiation detection system can include an array of scintillator elements including a first pair of scintillator elements, a second pair of scintillator elements, and a first reflective sheet, wherein the first pair of scintillator elements lies along a first line, and the second pair of scintillator elements lies along a second line that intersects of the first line. The first reflective sheet can be disposed between the scintillator elements of the first pair of scintillator elements, and no reflective sheet may be disposed between the scintillator elements of the second pair of scintillator elements.

In an embodiment of the first aspect, the array of scintillator elements is organized into rows and columns, reflective sheets, including the first reflective sheet, are disposed between the rows of immediately adjacent scintillator elements, and no reflective sheet is disposed between the columns of immediately adjacent scintillator elements. In another embodiment, the array of scintillator elements is organized into rows and columns, reflective sheets, including the first reflective sheet, are disposed between the columns of immediately adjacent scintillator elements, and no reflective sheet is disposed between the rows of immediately adjacent scintillator elements. In still another embodiment, the first reflective sheet includes a substantially white plastic sheet. In yet another embodiment, the first reflective sheet includes a specular surface. In a particular embodiment, the first reflective sheet includes a metallic foil, and in another particular embodiment, the first reflective sheet includes a metalized polymer.

In a further embodiment of the first aspect, a reflective material is disposed between the scintillator elements within the second pair of scintillator elements. In a particular embodiment, the reflective material includes substantially white particles, and in another particular embodiment, the reflective material includes reflective metal-containing particles. In still a further embodiment, the scintillator elements include an inorganic scintillator compound.

In another embodiment of the first aspect, a thickness of the scintillator elements is at least approximately 0.5 mm. In still another embodiment, a thickness of the scintillator elements is at least approximately 1.1 mm, at least approximately 2 mm, or at least approximately 5 mm. In yet another embodiment, a space between the scintillator elements within the first pair of scintillator elements is no greater than approximately 0.10 mm. In a further embodiment, the space between the scintillator elements is no greater than approximately 0.08 mm, no greater than approximately 0.05 mm, or no greater than approximately 0.03 mm. In a further embodiment, the radiation detection system further includes an array of photosensors optically coupled to the array of scintillator elements.

In a second aspect, a radiation detection system can include an array of scintillator elements including a first scintillator element and a second scintillator element, wherein the first and second scintillating elements are immediately adjacent scintillating elements that are spaced apart from each other by a space having a width no greater than approximately 0.10 mm.

In another embodiment of the second aspect, the array further includes a reflective sheet is disposed within the space. In still another embodiment, the first and second scintillator elements are immediately adjacent to each other. In yet another embodiment, the width of the space is no greater than approximately 0.08 mm, no greater than approximately 0.05 mm, or no greater than approximately 0.03 mm. In a particular embodiment, the array further includes a reflective sheet is disposed within the space, and in another particular embodiment, the first and second scintillator elements are immediately adjacent to each other.

In a further embodiment of the second aspect, the reflective sheet includes a substantially white plastic sheet. In still a further embodiment, the reflective sheet includes a specular surface. In a particular embodiment, the reflective sheet includes a metallic foil, and in another particular embodiment, the reflective sheet includes a metalized polymer. In yet a further embodiment, the scintillator elements include an inorganic scintillator compound. In another embodiment, a thickness of the scintillator elements is at least approximately 0.5 mm, at least approximately 1.1 mm, at least approximately 2 mm, or at least approximately 5 mm. In still another embodiment, the radiation detection system further includes an array of photosensors optically coupled to the array of scintillator elements.

In a third aspect, a process of forming a radiation detection system can include forming an array of scintillator elements. Forming the array can include joining a plurality of pieces together to form an object, wherein each of the pieces includes a scintillator material, and a joining region includes the spaces between immediately adjacent pieces. Forming the array can further include cutting the object to obtain a portion having a face, such that the portion includes parts of different pieces within the plurality of pieces. Forming the array can still further include cutting a groove within the portion, wherein the groove extends from the face and intersects the joining region.

In an embodiment of the third aspect, the scintillator material includes an inorganic scintillator compound. In still another embodiment, the object has a shape of a block. In yet another embodiment, the portion has a shape of a slice. In a further embodiment, forming the array further includes applying an adhesive material to a particular surface of a particular piece before joining the plurality of pieces together. In a particular embodiment, the adhesive material is optically transparent or translucent, the adhesive material includes substantially white particles, the adhesive material includes reflective metal-containing particles, or any combination thereof.

In another embodiment of the third aspect, joining the plurality of pieces together includes pressing the plurality of pieces together. In a particular embodiment, forming the array further includes removing adhesive lying outside the joining region after pressing the plurality of pieces together. In still another embodiment, forming the array further includes placing a reflective sheet between immediately adjacent pieces before joining the plurality of pieces together. In a particular embodiment, the reflective sheet includes a substantially white plastic sheet, and in another particular embodiment, the reflective sheet includes a specular surface. In a more particular embodiment, the reflective sheet includes a metallic foil, and in another more particular embodiment, the reflective sheet includes a metalized polymer.

In a further embodiment of the third aspect, forming the array further includes attaching the portion to a substrate, wherein cutting the groove is performed after attaching the portion on the substrate. In still a further embodiment, cutting the groove includes cutting the groove completely through a thickness of the portion. In yet a further embodiment, cutting the groove is performed using a saw blade. In a particular embodiment, a thickness of the portion is at least approximately 0.5 mm, at least approximately 1.1 mm, at least approximately 2 mm, or at least approximately 5 mm.

In another embodiment of the third aspect, the joining region has a width is no greater than approximately 0.10 mm, no greater than approximately 0.08 mm, no greater than approximately 0.05 mm, or no greater approximately 0.03 mm. In still another embodiment, forming the array further includes filling the groove with a reflective material. In a particular embodiment, forming the reflective material within the groove includes forming white particles within the groove. In a further embodiment, the process further includes optically coupling the array of scintillator elements to an array of photosensors.

In a fourth aspect, a process of forming a radiation detection system can include forming an array of scintillator elements. Forming the array can include placing an adhesive material and reflective sheets between faces of plates that include an inorganic scintillator material, pressing the plates together to form a block, wherein joining regions include spaces between the immediately adjacent plates, and removing portions of the adhesive material lying outside of the joining regions after pressing the plates together. Forming the array can also include cutting the block to obtain a slice, wherein cutting is performed such that a direction of cutting is substantially perpendicular to lengths of the joining regions, contacting a surface of the slice with an epoxy material, and cutting grooves completely through a thickness of the slice and only partly through the epoxy material, wherein length of the grooves are substantially perpendicular to the lengths of the joining region.

In an embodiment of the fourth aspect, the adhesive material is optically transparent or translucent, the adhesive material includes substantially white particles, the adhesive material includes reflective metal-containing particles, or any combination thereof. In another embodiment, the reflective sheet includes a substantially white plastic sheet, and in still another embodiment, the reflective sheet includes a specular surface. In a further embodiment, a thickness of the slice is at least approximately 0.5 mm, at least approximately 1.1 mm, at least approximately 2 mm, or at least approximately 5 mm. In a particular embodiment, cutting the groove is performed using a saw blade. In a more particular embodiment, the joining region has a width is no greater than approximately 0.10 mm, no greater than approximately 0.08 mm, no greater than approximately 0.05 mm, or no greater than approximately 0.03 mm. In still a further embodiment, forming the array of scintillator elements further includes forming an epoxy with white particles within the groove. In yet a further embodiment, the process further includes optically coupling the array of scintillator elements to an array of photosensors.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation detection system comprising:
an array of scintillator elements including a first pair of scintillator elements, a second pair of scintillator elements, and a first reflective sheet, wherein:
  the first pair of scintillator elements lies along a first line;
  the second pair of scintillator elements lies along a second line that intersects of the first line;
  the first reflective sheet is disposed between the scintillator elements of the first pair of scintillator elements; and
  no reflective sheet is disposed between the scintillator elements of the second pair of scintillator elements.

2. The radiation detection system of claim 1, wherein:
the array of scintillator elements is organized into rows and columns;
reflective sheets, including the first reflective sheet, are disposed between the rows of immediately adjacent scintillator elements; and
no reflective sheet is disposed between the columns of immediately adjacent scintillator elements.

3. The radiation detection system of claim 1, wherein:
the array of scintillator elements is organized into rows and columns;
reflective sheets, including the first reflective sheet, are disposed between the columns of immediately adjacent scintillator elements; and
no reflective sheet is disposed between the rows of immediately adjacent scintillator elements.

4. The radiation detection system of claim 1, further comprising a reflective material is disposed between the scintillator elements within the second pair of scintillator elements, wherein the reflective material includes substantially white particles.

5. The radiation detection system of claim 1, further comprising a reflective material is disposed between the scintillator elements within the second pair of scintillator elements, wherein the reflective material includes reflective metal-containing particles.

6. The radiation detection system of claim 1, wherein a thickness of the scintillator elements is at least approximately 0.5 mm.

7. The radiation detection system of claim 1, wherein a space between the scintillator elements within the first pair of scintillator elements is no greater than approximately 0.10 mm.

8. The radiation detection system of claim 1, further comprising an array of photosensors optically coupled to the array of scintillator elements.

9. The radiation detection system of claim 1, wherein a thickness of the scintillator elements is at least approximately 0.5 mm.

10. The radiation detection system of claim 1, further comprising an array of photosensors optically coupled to the array of scintillator elements.

11. A process of forming a radiation detection system comprising:
    forming an array of scintillator elements comprising:
        joining a plurality of pieces together to form an object, wherein each of the pieces includes a scintillator material, and a joining region includes the spaces between immediately adjacent pieces;
        cutting the object to obtain a portion having a face, such that the portion includes parts of different pieces within the plurality of pieces; and
        cutting a groove within the portion, wherein the groove extends from the face and intersects the joining region,
    wherein forming the array further comprises placing a reflective sheet between the immediately adjacent pieces before joining the plurality of pieces together.

12. The process of claim 11, wherein the portion has a shape of a slice.

13. The process of claim 11, wherein forming the array further comprises attaching the portion to a substrate, wherein cutting the groove is performed after attaching the portion on the substrate.

14. The process of claim 11, wherein cutting the groove is performed using a saw blade, and wherein a thickness of the portion is at least approximately 0.5 mm.

15. The process of claim 11, wherein the joining region has a width no greater than approximately 0.10 mm.

16. The process of claim 11, wherein forming the array further comprises filling the groove with a reflective material.

\* \* \* \* \*